US012772050B2

(12) United States Patent
Lehtovirta et al.

(10) Patent No.: US 12,772,050 B2
(45) Date of Patent: Oct. 20, 2026

(54) KEY DERIVATION FOR COMMUNICATION

(71) Applicant: Telefonaktiebolaget LM Ericsson (publ), Stockholm (SE)

(72) Inventors: Vesa Lehtovirta, Espoo (FI); Patrik Salmela, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 286 days.

(21) Appl. No.: 18/257,411

(22) PCT Filed: Dec. 28, 2020

(86) PCT No.: PCT/EP2020/087913

§ 371 (c)(1),
(2) Date: Jun. 14, 2023

(87) PCT Pub. No.: WO2022/144065

PCT Pub. Date: Jul. 7, 2022

(65) Prior Publication Data

US 2024/0107297 A1 Mar. 28, 2024

(51) Int. Cl.

*H04W 12/04* (2021.01)
*H04W 12/041* (2021.01)
*H04W 12/06* (2021.01)
*H04W 12/03* (2021.01)

(52) U.S. Cl.

CPC ......... *H04W 12/041* (2021.01); *H04W 12/06* (2013.01); *H04W 12/03* (2021.01)

(58) Field of Classification Search

CPC ............................ H04W 12/041; H04W 12/06
See application file for complete search history.

(56) References Cited

U.S. PATENT DOCUMENTS

2009/0193253 A1* 7/2009 Falk ...................... H04L 63/065 713/171
2020/0280849 A1 9/2020 Ito et al.
2022/0046416 A1* 2/2022 Suzuki .................. H04W 48/18

(Continued)

FOREIGN PATENT DOCUMENTS

WO WO-2020173863 A1 * 9/2020 .......... H04W 12/084

OTHER PUBLICATIONS

3GPP, "3GPP TR 33.819 V2.0.0", 3rd Generation Partnership Project; Technical Specification Group Services and System Aspects; Study on security for 5GS enhanced support of Vertical and LAN Services; (Release 16), Dec. 2019, 1-46.

(Continued)

*Primary Examiner* — David J Pearson
(74) *Attorney, Agent, or Firm* — Sonoda & Kobayashi Intellectual Property Law; Darren M. Gardner

(57) ABSTRACT

A communication device (2) generates a cryptographic key (20K) as a function of information (20B) bound to an intermediate communication network (20) via which the communication device (2) authenticates a subscription to a subscribed communication network (10). Here, the communication device (2) is served by a serving communication network (30) that differs from the intermediate communication network (20). The communication device (2) protects communication for the communication device (2) based on the generated cryptographic key (20K).

17 Claims, 18 Drawing Sheets

(56) References Cited

U.S. PATENT DOCUMENTS

| | | | | |
|---|---|---|---|---|
| 2023/0231851 A1* | 7/2023 | Kunz | .................... | H04W 60/06 455/411 |
| 2023/0247423 A1* | 8/2023 | Kunz | .................... | H04W 12/06 455/410 |

OTHER PUBLICATIONS

3GPP, "3GPP TS 33.220 V16.2.0", 3rd Generation Partnership Project; Technical Specification Group Services and System Aspects; Generic Authentication Architecture (GAA); Generic Bootstrapping Architecture (GBA) (Release 16), Sep. 2020, 1-93.

3GPP, "3GPP TS 33.220 V16.3.0", 3rd Generation Partnership Project; Technical Specification Group Services and System Aspects; Generic Authentication Architecture (GAA); Generic Bootstrapping Architecture (GBA) (Release 16), Dec. 2020, 1-93.

3GPP, "3GPP TS 33.501 V16.5.0", 3rd Generation Partnership Project; Technical Specification Group Services and System Aspects; Security architecture and procedures for 5G system (Release 16), Dec. 2020, 1-253.

3GPP, "3rd Generation Partnership Project; Technical Specification Group Services and System Aspects; Security architecture and procedures for 5G system (Release 16)", 3GPP TS 33.501 V16.4.0, Sep. 2020, 1-250.

* cited by examiner

KEY DERIVATION FOR COMMUNICATION

TECHNICAL FIELD

The present application relates generally to communication, and relates more particularly to key derivation for communication.

BACKGROUND

A communication network provides communication services to a subscriber that subscribes to receive those services. The communication network to which a subscriber has subscribed is referred to as the subscriber's home network. A subscriber can access its home network using any radio access network (RAN) provided by the home network itself. The geographical coverage area of the home network's RAN may be limited, though. The home network operator can nonetheless extend the geographical reach over which its communication services are accessible to its subscribers, by partnering with another communication network operator that agrees to share its RAN with the home network operator. With such a roaming partnership in place, subscribers can use the RAN that a so-called visited communication network shares with the home communication network in order to access the communication services of the home communication network, even when roaming outside of the home network's radio access coverage area.

A communication device's communications should be integrity and/or confidentiality protected, e.g., in order to safeguard the privacy of the device's user. Heretofore, when a communication device roams to a visited network, the cryptographic key used for integrity and/or confidentiality protection is bound to that visited network. This prevents the cryptographic key from being stolen and maliciously re-used to eavesdrop on communications with a different visited network. Binding the cryptographic key to the visited network, however, may prove insufficient in some circumstances, such as when the communication device subscribes to a non-public network (NPN).

SUMMARY

Some embodiments herein protect communication for a communication device even in circumstances where the communication device authenticates its subscription to a subscribed network via an intermediate network that differs from its serving network. For example, some embodiments protect communication for the communication device even where the communication device authenticates its subscription to a non-public network (NPN) via a home public network that differs from a visited/serving public network. Some embodiments do so based on a cryptographic key generated as a function of information bound to the intermediate network. That is, some embodiments effectively bind the cryptographic key used for protection to the intermediate network. This advantageously prevents the cryptographic key from being maliciously re-used for eavesdropping on communications associated with a different intermediate network.

More particularly, embodiments herein include a method performed by a communication device. The method comprises generating a cryptographic key as a function of information bound to an intermediate communication network via which the communication device authenticates a subscription to a subscribed communication network. In this case, the communication device is served by a serving communication network that differs from the intermediate communication network. The method also comprises protecting communication for the communication device based on the generated cryptographic key.

In some embodiments, the subscribed communication network is a non-public network, NPN.

In some embodiments, the intermediate communication network is a public network. Additionally or alternatively, the serving communication network is a public network.

In some embodiments, the information bound to the intermediate communication network is an identity of the intermediate communication network.

In some embodiments, the cryptographic key is, or is generated also as a function of, a key shared between the communication device and an authentication server in the subscribed communication network.

In some embodiments, the cryptographic key is, or is generated also as a function of, a key $K_{AUSF}$*.

In some embodiments, the cryptographic key is, or is generated also as a function of, a key CK' or IK'.

In some embodiments, the cryptographic key is generated also as a function of a Master Session Key, MSK, or an Extended MSK, EMSK.

In some embodiments, the cryptographic key is generated also as a function of information bound to the serving communication network.

In some embodiments, the information bound to the intermediate communication network is included in, or encoded within, a serving network name parameter.

In some embodiments, the intermediate communication network provides an access network for the subscribed communication network.

Other embodiments herein include a method performed by a network node in a subscribed communication network to which a communication device has a subscription. The method comprises generating a cryptographic key as a function of information bound to an intermediate communication network via which the communication device authenticates the subscription to the subscribed communication network. In this case, the communication device is served by a serving communication network that differs from the intermediate communication network. The method also comprises sending the cryptographic key to the intermediate communication network.

In some embodiments, the subscribed communication network is a non-public network, NPN.

In some embodiments, the intermediate communication network is a public network. Additionally or alternatively, the serving communication network is a public network.

In some embodiments, the information bound to the intermediate communication network is an identity of the intermediate communication network.

In some embodiments, the cryptographic key is, or is generated as a function of, a key shared between the communication device and an authentication server in the subscribed communication network.

In some embodiments, the cryptographic key is, or is generated as a function of, a key $K_{AUSF}$*.

In some embodiments, the cryptographic key is generated as a function of a Master Session Key, MSK, or an Extended MSK, EMSK.

In some embodiments, the cryptographic key is, or is generated also as a function of, a key CK' or IK'.

In some embodiments, the cryptographic key is generated as a function of information bound to the serving communication network.

In some embodiments, the information bound to the intermediate communication network is included in, or encoded within, a serving network name parameter.

In some embodiments, the intermediate communication network provides an access network for the subscribed communication network.

In some embodiments, the method further comprises receiving the information from the intermediate communication network within a request message requesting authentication of the subscription. In this case, sending the cryptographic key comprises sending the cryptographic key to the intermediate communication network within a response message.

In some embodiments, the method further comprises deducing the information from an interface on which the network node receives an authentication request message requesting authentication of the subscription.

In some embodiments, the network node is or implements an authentication server.

Other embodiments herein include a method performed by a network node in an intermediate communication network. The method comprises receiving, from a serving communication network serving a communication device, a first authentication request message requesting authentication of a subscription of the communication device to a subscribed communication network. The method also comprises, responsive to receiving the first authentication request message, transmitting, to the subscribed communication network, a second authentication request message requesting authentication of the subscription of the communication device to the subscribed communication network. In this case, the second authentication request message includes information bound to the intermediate communication network.

In some embodiments, the subscribed communication network is a non-public network, NPN.

In some embodiments, the intermediate communication network is a public network. Additionally or alternatively, the serving communication network is a public network.

In some embodiments, the information bound to the intermediate communication network is an identity of the intermediate communication network.

In some embodiments, the method also comprises receiving, from the subscribed communication network, an authentication response message that includes a cryptographic key which is based on the information. In one or more of these embodiments, the cryptographic key is, or is derived from, a key shared between the communication device and an authentication server in the subscribed communication network. In one or more of these embodiments, the cryptographic key is, or is derived from, a key $K_{AUSF}$. In one or more of these embodiments, the cryptographic key is, or is derived from, a key CK or IK.

In some embodiments, the method also comprises obtaining a serving network name parameter that includes the information bound to the intermediate communication network. In this case, sending the information to the subscribed communication network comprises sending the serving network name parameter to the subscribed communication network.

In some embodiments, the intermediate communication network provides an access network for the subscribed communication network.

In some embodiments, the network node is or implements an authentication server.

Other embodiments herein include a communication device. The communication device comprises communication circuitry and processing circuitry. The processing circuitry is configured to generate a cryptographic key as a function of information bound to an intermediate communication network via which the communication device authenticates a subscription to a subscribed communication network. In this case, the communication device is served by a serving communication network that differs from the intermediate communication network. The processing circuitry is also configured to protect communication for the communication device based on the generated cryptographic key.

In some embodiments, the processing circuitry is configured to perform the steps described above for the communication device.

Other embodiments herein include a network node configured for use in a subscribed communication network to which a communication device has a subscription. The network node comprises communication circuitry and processing circuitry. The processing circuitry is configured to generate a cryptographic key as a function of information bound to an intermediate communication network via which the communication device authenticates the subscription to the subscribed communication network. In this case, the communication device is served by a serving communication network that differs from the intermediate communication network. The processing circuitry is also configured to send the cryptographic key to the intermediate communication network.

In some embodiments, the processing circuitry is configured to perform the steps described above for the network node in a subscribed communication network.

Other embodiments herein include a network node in an intermediate communication network. The network node comprises communication circuitry and processing circuitry. The processing circuitry is configured to receive, from a serving communication network serving a communication device, a first authentication request message requesting authentication of a subscription of the communication device to a subscribed communication network. The processing circuitry is also configured to, responsive to receiving the first authentication request message, transmit, to the subscribed communication network, a second authentication request message requesting authentication of the subscription of the communication device to the subscribed communication network. In this case, the second authentication request message includes information bound to the intermediate communication network.

In some embodiments, the processing circuitry is configured to perform the steps described above for the network node in an intermediate communication network.

Other embodiments herein include a computer program comprising instructions which, when executed by at least one processor of a communication device, causes the communication device to perform the steps described above for the communication device. Other embodiments herein include a computer program comprising instructions which, when executed by at least one processor of a network node, causes the network node to perform the steps described above for the network node in a subscribed communication network. In some embodiments, a carrier, containing any of the computer programs described above, is one of an electronic signal, optical signal, radio signal, or computer readable storage medium.

Of course, the present disclosure is not limited to the above features and advantages. Indeed, those skilled in the art will recognize additional features and advantages upon reading the following detailed description, and upon viewing the accompanying drawings.

DETAILED DESCRIPTION

Figure 1:
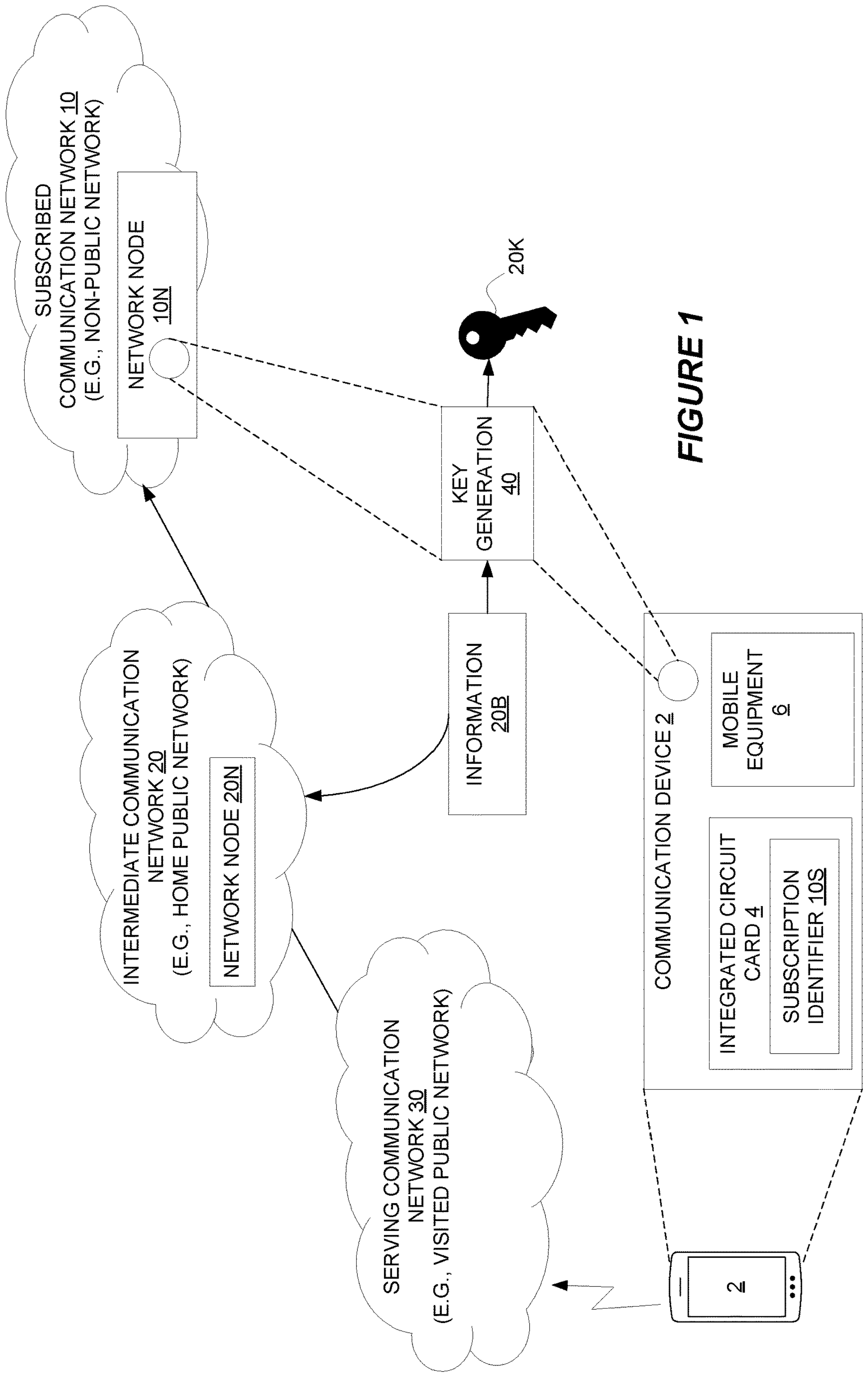
FIG. 1 is a block diagram of key generation for protecting communication according to some embodiments.

FIG. 1 shows a communication device 2 configured for communication. In some embodiments, the communication device 2 is a wireless communication device configured for wireless communication. As shown in FIG. 1, for example, the communication device is exemplified as a user equipment (UE) or mobile device.

In any event, the communication device 2 is associated with a subscription to subscribed communication network 10, e.g., a subscribed wireless communication network. FIG. 1 depicts this association as being by way of an integrated circuit card 4 (e.g., a subscriber identity module, SIM) that is configured to be removably inserted into or embedded or integrated in the communication device 2. This integrated circuit card 4 stores in memory a subscription identifier 10S that identifies the subscription to subscribed communication network 10. The subscription identifier 10S may for example be an International Mobile Subscriber Identity (IMSI), a Network Access Identifier (NAI), or any other type of Subscription Permanent Identifier (SUPI). The integrated circuit card 4 may also store credentials (e.g., one or more keys) associated with the subscription identifier 10S. In other embodiments not shown, though, the subscription identifier 10S and any associated credentials may be stored directly on the communication device 2 itself, e.g., on mobile equipment (ME) 6. Regardless of how the subscription identifier 10S is associated with the communication device 2, the communication device 2 may indicate the subscription identifier 10S to subscribed communication network 10 as part of a procedure to register with and/or authenticate itself to the subscribed communication network 10, e.g., as a prerequisite to being provided communication service from the subscribed communication network 10.

As shown in FIG. 1, though, the communication device 2 does not necessarily access the subscribed communication network 10 directly. Instead, the communication device 2 accesses the subscribed communication network 10 via an intermediate communication network 20 and a serving communication network 30. The subscribed communication network 10, the intermediate communication network 20, and the serving communication network 30 are different from one another, e.g., in the sense that the networks 10, 20, and 30 have different operators and/or use different communication technologies. In any event, as shown, the serving and intermediate communication networks 20 and 30 form a chain of networks via which the communication device 2 authenticates its subscription to and accesses the subscribed communication network 10.

In some embodiments, for example, the intermediate communication network 20 shares its radio access network (RAN) with the subscribed communication network 10 so as to provide radio access to subscribers of the subscribed communication network 10. The intermediate communication network 20 may thereby also be referred to as a cooperating network, since it cooperates with the subscribed communication network 10. Regardless, the intermediate communication network 20 may in turn have a direct roaming partnership with the serving communication network 30, so that communication device 2 may roam to the serving communication network 30 and access the intermediate communication network 20 via the serving communication network 30. In this case, even though the serving communication network 30 does not have a direct roaming partnership with the subscribed communication network 10, the communication device 2 is still able to authorize its subscription to and access the subscribed communication network 10 via the serving communication network 30, by way of the roaming partnership between the intermediate communication network 20 and the serving communication network 30.

Some embodiments protect communication for the communication device 2 in this context. One or more embodiments, for example, apply integrity protection and/or confidentiality protection to communication between the communication device 2 and the serving communication network 30, between the communication device 2 and the intermediate communication network 20, or between the communication device 2 and the subscribed communication network 10. Regardless, some embodiments protect communication for the communication device 2 in this way based on a cryptographic key 20K. As shown, the communication device 2 and a network node 10N in the subscribed communication network 10 each independently generate this cryptographic key 20K by performing key generation 40.

Notably, embodiments herein generate the cryptographic key 20K (by performing key generation 40) as a function of information 20B bound to the intermediate communication network 20 via which the communication device 2 authenticates its subscription to the subscribed communication network 10. That is, some embodiments effectively bind the cryptographic key 20K used for protection to the intermediate communication network 20. The cryptographic key 20K may be bound to the intermediate communication network 20 in this way in addition to or instead of being bound to the serving communication network 20. Binding the cryptographic key 20K to at least the intermediate communication network 20 advantageously prevents the cryptographic key 20K from being maliciously re-used for eavesdropping on communications associated with a different intermediate network. In other words, even if the cryptographic key 20K were to be stolen from the intermediate communication network 20, the cryptographic key 20K could not be re-used in another setting, because it is bound to at least the intermediate communication network 20.

In some embodiments, the information 20B bound to the intermediate communication network 20 is an identity of the intermediate communication network 20. The identity may for instance be represented as a Mobile Network Code (MNC), a Mobile Country Code (MCC), or a combination thereof. The identity may alternatively be represented as a realm, e.g., network1.operator.com. In other embodiments, the information 20B bound to the intermediate communication network 20 is included in, or encoded within, a serving network name (SNN) parameter. The SNN parameter in this case may include not only an SNN service code (e.g., 5G) and an SNN network identifier (e.g., the MCC and MNC) for the serving communication network 30, but also an SNN service code and an SNN network identifier for the intermediate communication network 20.

Figure 2:
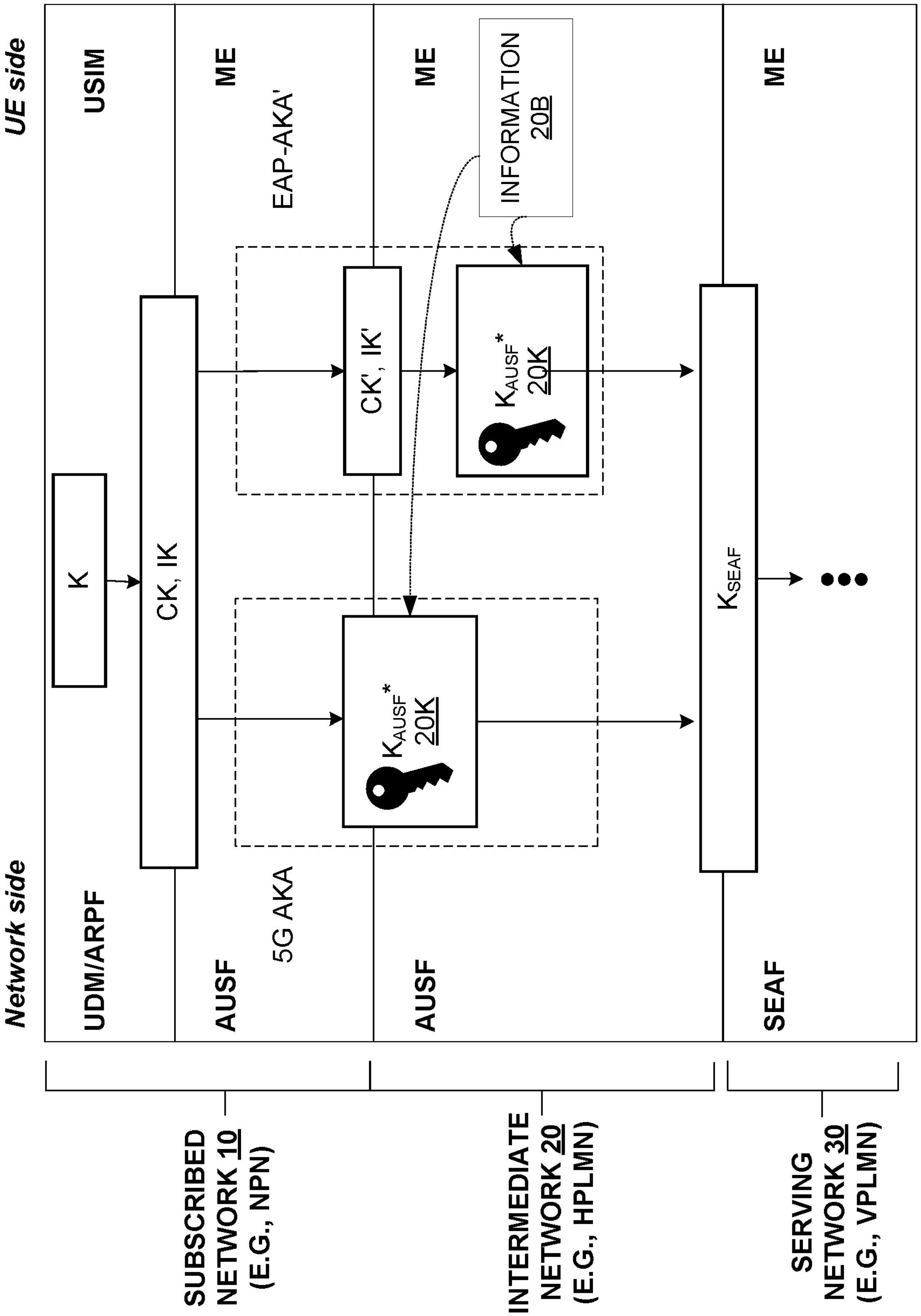
FIG. 2 is a block diagram of a key hierarchy according to some embodiments.

No matter the particular nature of the information 20B, the cryptographic key 20K may be any type of key usable to protect communication for the communication device 2. In some embodiments, for instance, the cryptographic key 20K is, or is generated also as a function of, a key shared between the communication device 2 and an authentication server in the subscribed communication network 10. FIG. 2 shows one example where the authentication server is or implements an Authentication Server Function (AUSF) in a 5G network and where the communication device 2 is exemplified as a User Equipment (UE).

In the example of FIG. 2, a long-term key K is stored securely on the UE's integrated circuit card 4 (e.g., in the form of a Universal Subscriber Identity Module, USIM). The long-term key K is also stored in a Unified Data Management (UDM) function/Authentication Credential Repository and Processing Function (ARPF) in the subscribed communication network 10.

During or after a Primary Authentication procedure between the UE and the AUSF in the subscribed communication network 10, the AUSF in the subscribed communication network 10 obtains one or more keys $K_{AUTH}$ from the long-term key K. For 5G Authentication and Key Agreement (AKA), the one or more keys $K_{AUTH}$ take the form of a confidentiality key (CK) and an integrity key (IK). For the Extensible Authentication Protocol AKA' (EAP-AKA'), the one or more keys $K_{AUTH}$ take the form of keys CK' and IK' that are derived from CK and IK.

Regardless of the particular nature of the one or more keys $K_{AUTH}$, though, the AUSF in the subscribed communication network 10 generates the cryptographic key 20K from the key(s) $K_{AUTH}$ and the information 20B bound to the intermediate communication network 20. The cryptographic key 20K in this case is referred to as the key $K_{AUSF}$*, e.g., which is modified with respect to the key $K_{AUSF}$ as specified in 3GPP TS 33.501 v16.4.0. For example, where the information 20B is an ID of the intermediate communication network 20, the cryptographic key 20K may be generated as:

$$K_{AUSF}{}^{*}=\mathrm{KDF}(K_{AUTH},\mathrm{ID},\ldots)$$

where KDF is a key derivation function such as the one defined in Annex B of 3GPP Technical Specification 33.220 v.16.2.0, where ID is the ID of the intermediate communication network 20, and where " . . . " indicates the cryptographic key may be generated also as a function of one or more other unspecified parameters. Here, then, the ID amounts to a new input parameter on which the key $K_{AUSF}$*is generated.

In some embodiments, the cryptographic key 20K in the form of $K_{AUSF}$*is shared between the UE and the AUSF in the subscribed communication network 10. The cryptographic key 20K may be shared in the sense that both the UE and the AUSF independently generate the cryptographic key 20K, e.g., according to the same parameters and KDF.

Moreover, in some embodiments as shown, the AUSF in the subscribed communication network 10 further shares the cryptographic key 20K (or a key derived therefrom) with the intermediate communication network 10. In particular, the AUSF in the subscribed communication network 10 may transmit the cryptographic key 20K to the AUSF in the intermediate communication network 20. The AUSF in the intermediate communication network 20 may then use the cryptographic key 20K in a similar way as done for the key $K_{AUSF}$ specified in 3GPP TS 33.501 v16.4.0. For example, in some embodiments, the key $K_{AUSF}$ may be used for the integrity protection of messages delivered to the UE from the intermediate communication network 20.

The cryptographic key 20K in the form of $K_{AUSF}$*is then used to generate another key, $K_{SEAF}$, that is sent to the serving PLMN. This key $K_{SEAF}$ (also referred to as an anchor key) is then used to derive various non-access stratum (NAS) and access stratum (AS) protection keys, e.g., as specified in 3GPP TS 33.501 v16.4.0. These lower level keys together with other security parameters such as the cryptographic algorithms, the UE security capabilities, the value of the counters used for replay protection in the different protocols, etc., constitute what is defined as the 5G security context.

Although FIG. 2 illustrated an example where the cryptographic key 20K is a key $K_{AUSF}$*, in other embodiments the cryptographic key 20K may be generated as a function of this key $K_{AUSF}$*. That is, the cryptographic key 20K based on which communications are protected is generated as a function of (e.g., derived from) the key $K_{AUSF}$*.

Figure 3:
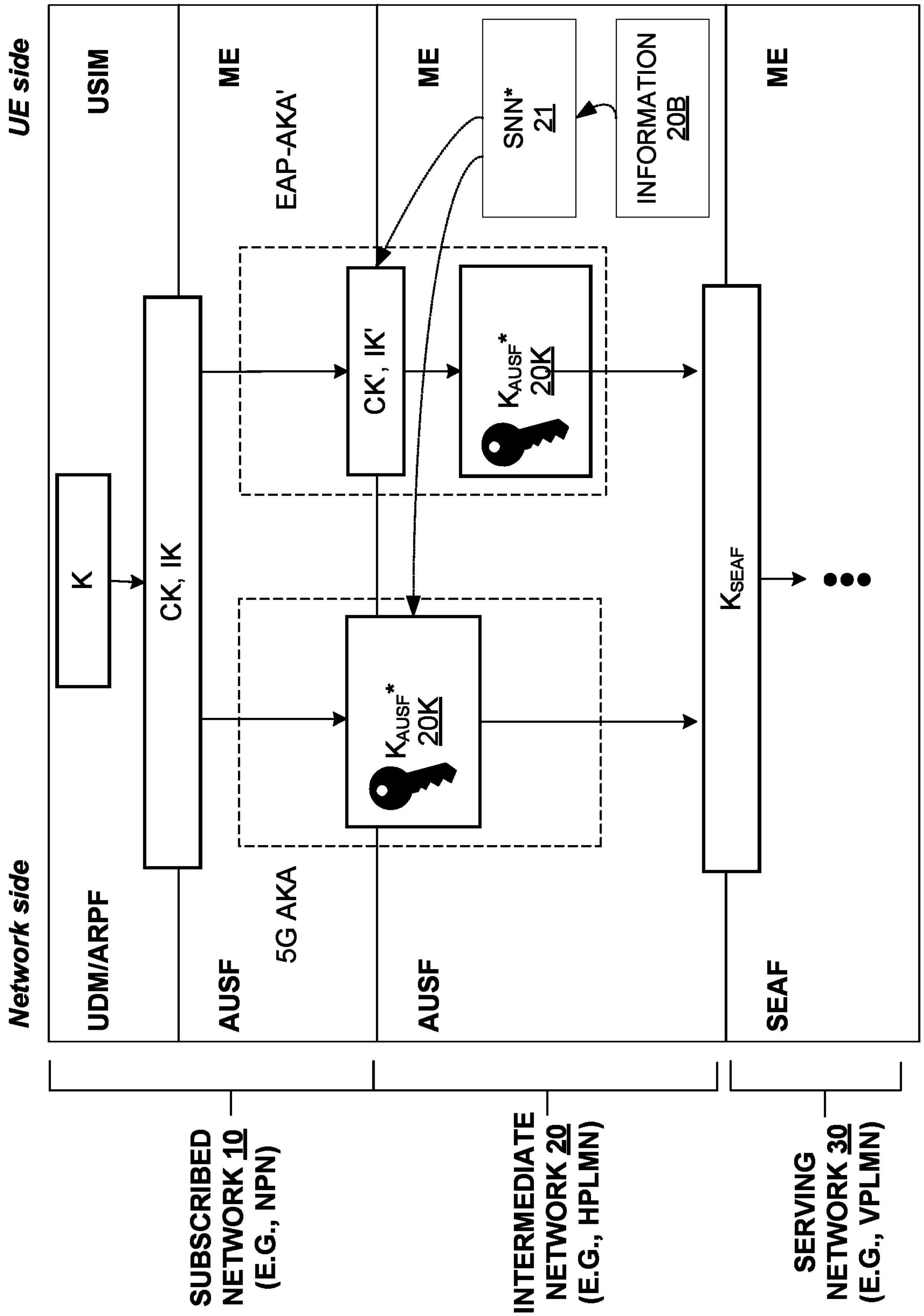
FIG. 3 is a block diagram of a key hierarchy according to other embodiments.

Note too that in some embodiments, as suggested above, generating the key $K_{AUSF}$* based on the information 20B bound to the intermediate communication network 20 may be accomplished by generating the key $K_{AUSF}$* as a function of a new input parameter, e.g., the ID of the intermediate communication network 20. In other embodiments, though, generating the key $K_{AUSF}$* based on the information 20B bound to the intermediate communication network 20 may be accomplished by modifying an existing input parameter on which the key $K_{AUSF}$*is generated, so that the existing input parameter is based on the information 20B bound to the intermediate communication network 20. FIG. 3 shows various examples.

As shown in FIG. 3, the parameter serving network name (SNN)*21 is generated as a function of the information 20B bound to the intermediate communication network 20. In one or more such embodiments, for instance, information 20B in the form of the ID or name of the intermediate communication network 20 is included or encoded in the SNN* 21, e.g., in addition to the name or ID of the serving communication network 30 as specified in clause 6.1.1.4 of TS 33.501 v16.4.0. Accordingly, in some embodiments, when the intermediate communication network 20 sends the subscribed communication network 10 the SNN* 21 on which the keying material is to be generated, the intermediate communication network 20 may form the SNN* 21 so that it also includes the ID or name of the intermediate communication network 20. Or, in other embodiments, when the subscribed communication network 10 receives the SNN* 21 from the intermediate communication network 20, the subscribed communication network 10 deduces the ID of the intermediate communication network 20 (e.g., from the used communication interface between the networks 10, 20) and modifies the received SNN* 21 to also include the ID of the intermediate communication network 20.

Then, at least for 5G AKA, the key $K_{AUSF}$*is generated as a function of this SNN* 21. By generating the key $K_{AUSF}$* based on the SNN* 21, the subscribed communication network 10 will effectively generate the key $K_{AUSF}$* based on the ID or name of the intermediate communication network 20. The ID or name of the intermediate communication network 20 will thereby be bound to the key $K_{AUSF}$*. In these and other embodiments where the subscribed communication network 10 is a 5G network, the AUSF in the subscribed network 10 may be the entity that generates the key $K_{AUSF}$* in this way, e.g., as part of the 5G authentication vector (AV) calculation for 5G AKA.

Alternatively or additionally, for EAP-AKA', the subscribed communication network 10 generates the key CK' and/or the key IK' as a function of the SNN* 21. The AUSF in the subscribed communication network 10 may thereby calculate and provides the CK' and/or IK' to the AUSF in the intermediate communication network 20, with the benefit that CK' and/or IK' are bound to the ID or name of the intermediate communication network 20. In this case, then, the key $K_{AUSF}$*is generated from existing parameters, including CK' and/or IK', but because CK' and/or IK' are bound to the ID or name of the intermediate communication network 20, the key $K_{AUSF}$*is likewise bound to the ID or name of the intermediate communication network 20. Note, too, that these embodiments preserve the role of AUSF in the intermediate communication network 20, since the AUSF would in this case be the EAP server instead of being an EAP authenticator conveying EAP messages.

In still other embodiments herein that use EAP authentication methods which produce keys called Master Session Key (MSK) and Extended MSK (EMSK), the cryptographic key 20K (e.g., in the form of key $K_{AUSF}$*) may be generated also as a function of such MSK or EMSK. For example, the AUSF in the subscribed communication network 10 may use the EMSK, the MSK, or a key derived from MSK or EMSK as the $K_{AUTH}$ described above in order to derive the key $K_{AUSF}$*.

Figure 4:
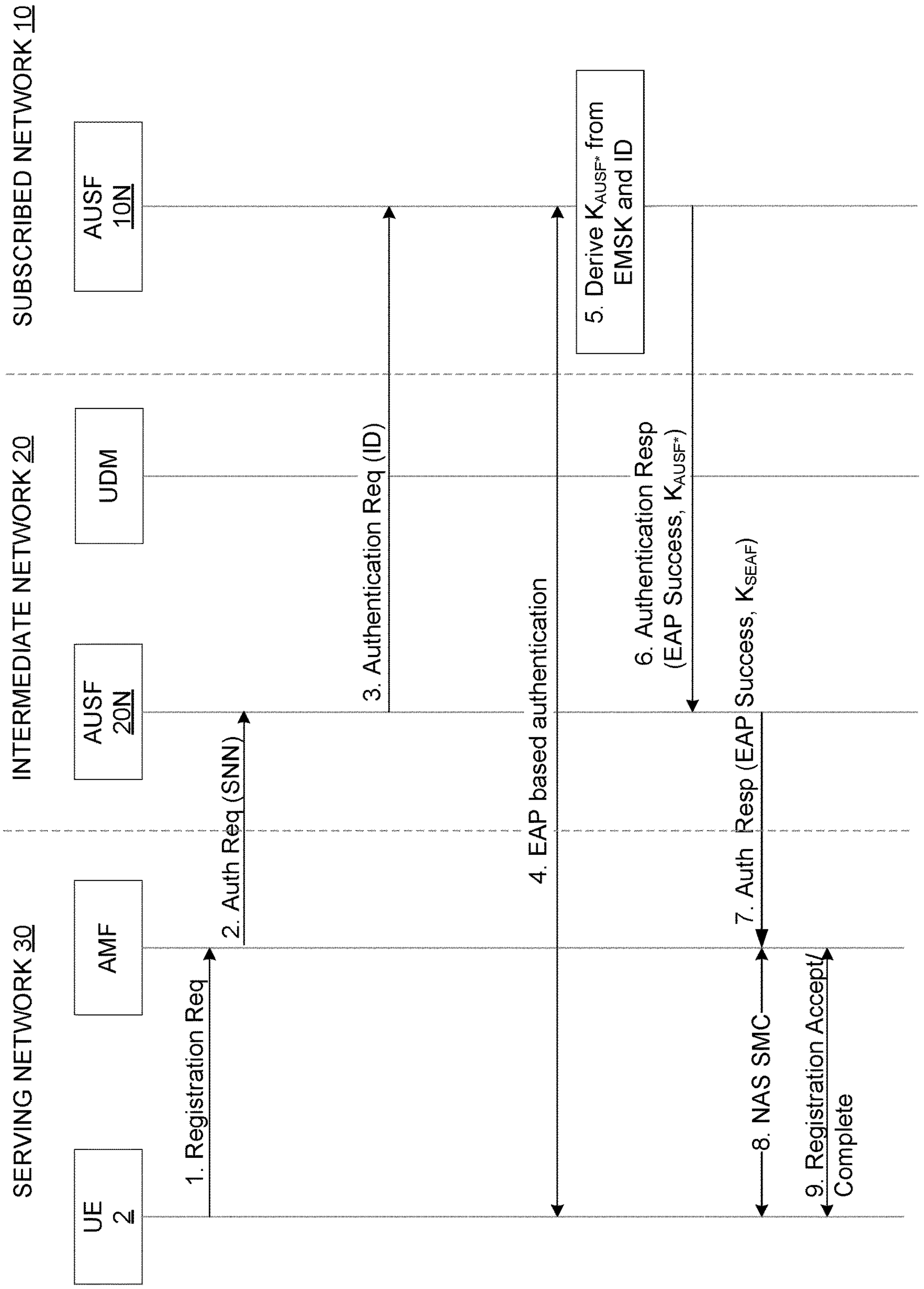
FIG. 4 is a call flow diagram for a registration procedure according to some embodiments.

FIG. 4 shows the call flow diagram for one such embodiment where the key $K_{AUSF}$*is generated based on the EMSK as well as based on information 20B in the form of the ID of the intermediate communication network 20. The UE 2 first initiates a registration procedure for registering with the subscribed communication network 10 via the serving communication network 30 and via the intermediate communication network 20 (Step 1). As part of this procedure, the UE 2 sends a registration request message to the AMF of the serving communication network 30 (Step 1). The AMF in turn decides to trigger an authentication procedure by sending an Authenticate Request to the AUSF within the intermediate communication network 20 (Step 2). This AUSF in the intermediate communication network 20 is an example of the network node 20N in FIG. 1. Regardless, the Authenticate Request includes the SNN that identifies the serving communication network 30.

The AUSF within the intermediate communication network 20 determines that primary authentication is to be performed with the AUSF within the subscribed communication network 10. The AUSF in the subscribed communication network 10 is an example of the network node 10N in FIG. 1. In any event, to perform primary authentication, the AUSF in the intermediate communication network 20 sends an Authentication Request message to the AUSF in the subscribed communication network 10 (Step 3). Notably, this Authentication Request message includes the ID of the intermediate communication network 20, e.g., instead of, in addition to, or embedded in the SNN.

The UE 2 and the AUSF 10N in the subscribed communication network 10 engage in the EAP based authentication exchange (Step 4). The messages are relayed to the UE 2 through the AUSF in the intermediate communication network 20 and the AMF in the serving communication network 30. A successful authentication leads to the establishment of the MSK and EMSK keys between the UE 2 and the AUSF 10N. Upon such an event, the AUSF 10N in the subscribed communication network 10 derives the key $K_{AUSF}$* using the EMSK and the received ID of the intermediate communication network 10 (Step 5).

The AUSF 10N in the subscribed communication network 10 then sends an Authentication Response message to the AUSF in the intermediate communication network 20 (Step 6). The Authentication Response message consists of an EAP Success message, and also includes $K_{AUSF}$*.

The AUSF 20N within the intermediate communication network 20 derives the $K_{SEAF}$ from the received $K_{AUSF}$* and SNN, e.g., as defined in TS 33.501 v16.4.0. The AUSF 20N then sends an Authentication Response message to the AMF, including the $K_{SEAF}$ (Step 7).

The UE 2 derives $K_{AUSF}$* from EMSK similarly as the AUSF 10N in the subscribed communication network 10 did, and derives $K_{SEAF}$ and other keys as defined in TS 33.501 v16.4.0.

NAS security establishment proceeds via a run of the NAS Security Mode Command (SMC) procedure (Step 8). Once NAS security is activated, all of the following NAS messages are integrity and confidentiality protected. In Step 9, the registration procedure continues and eventually is completed by the AMF sending a Registration Accept message and the UE 2 optionally responding with the Registration Complete message.

Some embodiments herein are particularly applicable in a scenario where the subscribed communication network 10 is a non-public network (NPN). An NPN as used herein is a network intended for non-public use. An NPN may for example be a network that is at least partly private. An NPN may thereby have one or more parts in an isolated network deployment that does not interact with a public network. At least one or more parts of an NPN may for example be operated by a private network operator which only allows certain pre-registered clients to attach to it. In some embodiments, though, some network functionality may be provided by a public network operator. For example, some network functionality, such as radio access and/or the control plane, may be provided by a public network operator, e.g., as a service for the private network operator.

As a particular concrete use case, an NPN may be a so-called standalone NPN (SNPN). In some embodiments, all functionality of the SNPN is provided by a private network operator. In other embodiments, all functionality of the SNPN except for radio access is provided by a private network operator, with radio access being provided by (e.g., shared with) a public network operator. The public network in this case may advertise a so-called network identifier (NID) of the NPN over the radio interface, so that communication devices can discover the NID and know that the NPN can be accessed via the public network. In some embodiments, globally unique NIDs identify different NPNs, whereas in other embodiments different combinations of PLMN IDs and NIDs identify different NPNs. An SNPN in either case may for example be a smart factory network that uses an intermediate private or public 5G network for radio access.

Regardless, in embodiments where the subscribed communication network 10 is an NPN 10, the intermediate communication network 20 may be a public network that provides an access network for the subscribed communication network 10, e.g., according to a business agreement between the communication network operators. The intermediate communication network 20 may in this case be referred to as a home public network 20 (e.g., home public land mobile network, HPLMN) of the communication device 2, with respect to the NPN 10. The home public network 20 may in some cases even advertise, over at least a part of its coverage area, an NID of the NPN 10. In one or more of these embodiments, the communication device 2 may be preconfigured with information about the home public network 20, e.g., PLMN ID. The communication device 2 may in this case be configured to scan for the home public network 20, based on the understanding that the home public network 20 provides radio access for the NPN 10. When the communication device 2 discovers the home public network 20, in conjunction with the NID being advertised by the NPN 20, the communication device 2 can attempt to access the NPN 10 via the home public network 20. For example, the communication device 2 can perform a procedure to register with and/or authenticate itself to the NPN 10, via the home public network 20.

FIG. 1 also shows that embodiments herein enable the communication device 2 to access, register with, and/or authenticate to the NPN 10 even when roaming away from the home public network 20. FIG. 1 in this regard shows that the serving communication network 30 may be another public network that is a roaming partner of the home public network 20, e.g., according to a business agreement. The serving communication network 30 may therefore be referred to as a visited public network 30. This visited public network 30 may provide radio access to the communication device 2 when the communication device 2 is outside of the geographical area(s) within which the home public network 20 provides radio coverage and/or advertises the NID of the NPN 10. Indeed, the communication device 2 according to some embodiments may scan not only for the home public network 20, but also scan for the visited public network 30. The visited public network 30 may for example be included in a list at the communication device 2 that indicates one or more allowed visited networks, e.g., that are each a roaming partner of the home public network 20. That is, the communication device 2 may be preconfigured with information about the roaming partner(s) of the home public network 20. If the communication device 2 discovers the visited public network 30, the communication device 2 may register with and/or authenticate with the NPN 10 via the home public network 20 and the visited public network 30. In this case, then, the authentication procedure between the communication device 2 and the NPN 2 is performed through both the home public network 20 and the visited public network 30.

As part of this procedure, the cryptographic key 20K may be generated at the communication device 2 and/or the NPN 10 as described above, i.e., based on information 20B bound to the intermediate communication network 20 in the form of the home public network. That is, the cryptographic key 20K is bound to the home public network that shares its RAN with the NPN 10, e.g., in addition to or instead of being bound to the visited public network that is a roaming partner of the home public network. This way, the communication device 2 and the NPN 10 have the same understanding (via usage of the cryptographic key 20K) that the intended home public network 20 (and optionally also the intended visited public network 30) is on the communication path between the communication device 2 and the NPN 10. Accordingly, if the cryptographic key 20K is stolen, e.g., in the home public network 20, an attacker cannot use the cryptographic key 20K outside of its intended context and cannot therefore masquerade as the home public network 20 to the communication device 2.

Note further that, although some embodiments are described above with focus on registration of the communication device 2 with the subscribed communication network 10 (e.g., NPN), registration herein may be performed (or viewed as being performed) with any of the subscribed communication network 10, the intermediate communication network 20, and/or the serving communication network 30. Embodiments described above for registration with the subscribed communication network 10 may be similarly applied for registration with the intermediate communication network 20 and/or the serving communication network 30.

Figure 5:
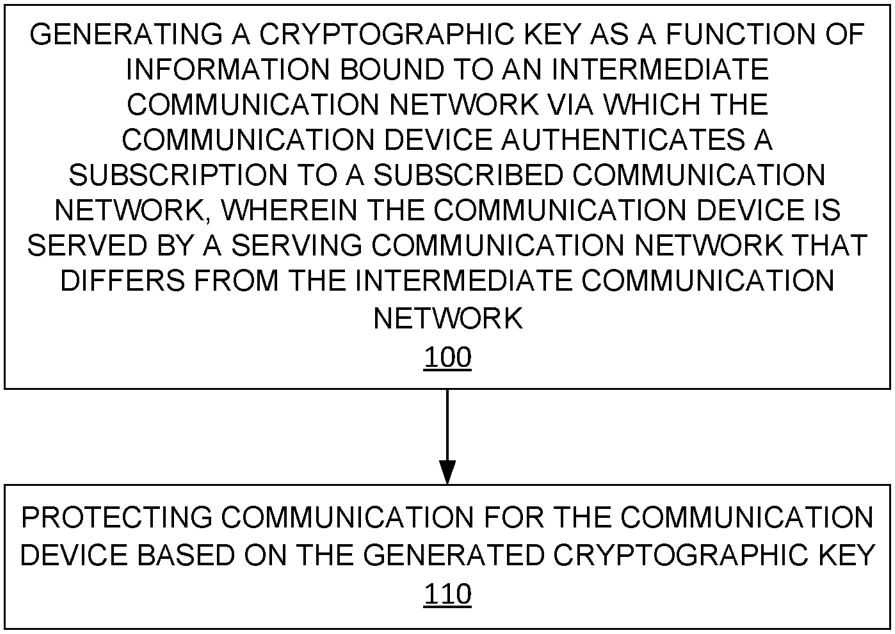
FIG. 5 is a logic flow diagram of a method performed by a communication device according to some embodiments.

In view of the above modifications and variations, FIG. 5 depicts a method performed by a communication device 2 in accordance with particular embodiments. The method includes generating a cryptographic key 20K as a function of information 20B bound to an intermediate communication network 20 via which the communication device 2 authenticates a subscription to a subscribed communication network 10 (Block 100). The communication device 2 here is served by a serving communication network 30 that differs from the intermediate communication network 20.

The method also comprises protecting communication for the communication device 2 based on the generated cryptographic key 20 (Block 110). Such protection may for example be integrity protection and/or confidentiality protection.

Figure 6:
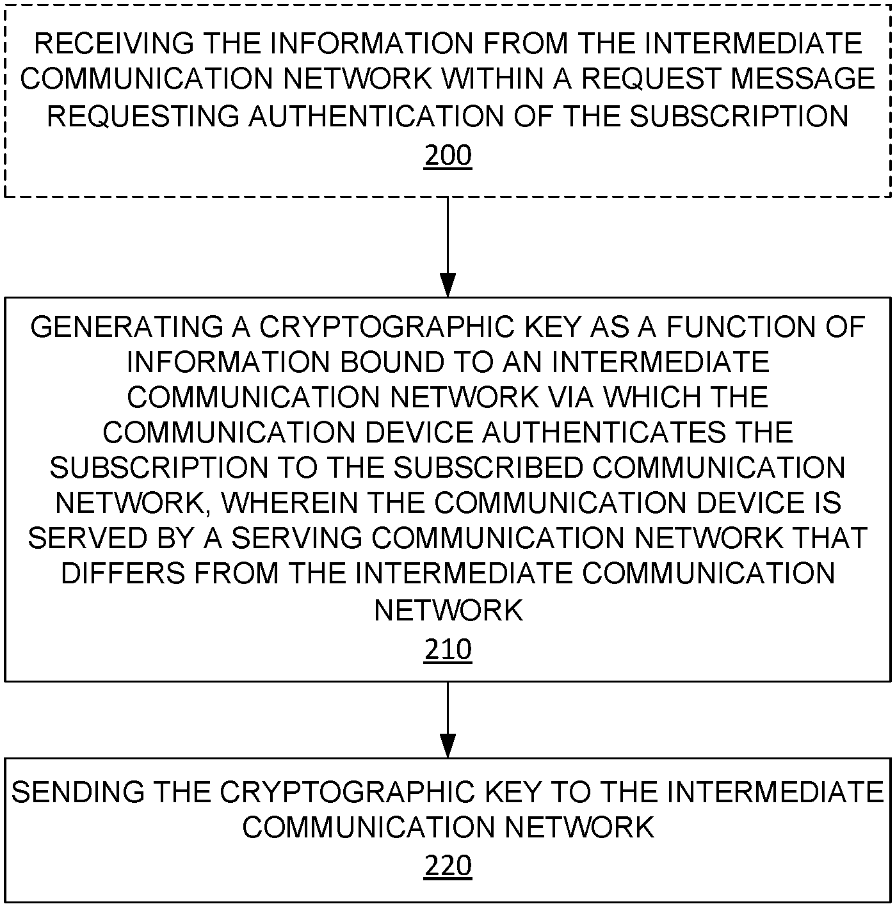
FIG. 6 is a logic flow diagram of a method performed by a network node in a subscribed communication network according to some embodiments.

FIG. 6 depicts a method performed by a network node 10N in a subscribed communication network 10 to which a communication device 2 has a subscription in accordance with other particular embodiments. The method includes generating a cryptographic key 20K as a function of information 20B bound to an intermediate communication network 20 via which the communication device 2 authenticates the subscription to the subscribed communication network 10 (Block 210). Here, the communication device 2 is served by a serving communication network 30 that differs from the intermediate communication network 20. The method as shown also includes sending the cryptographic key 20K to the intermediate communication network 20 (Block 220).

In some embodiments, the method also comprises receiving the information 20B from the intermediate communication network 20 within a request message requesting authentication of the subscription (Block 200).

Figure 7:
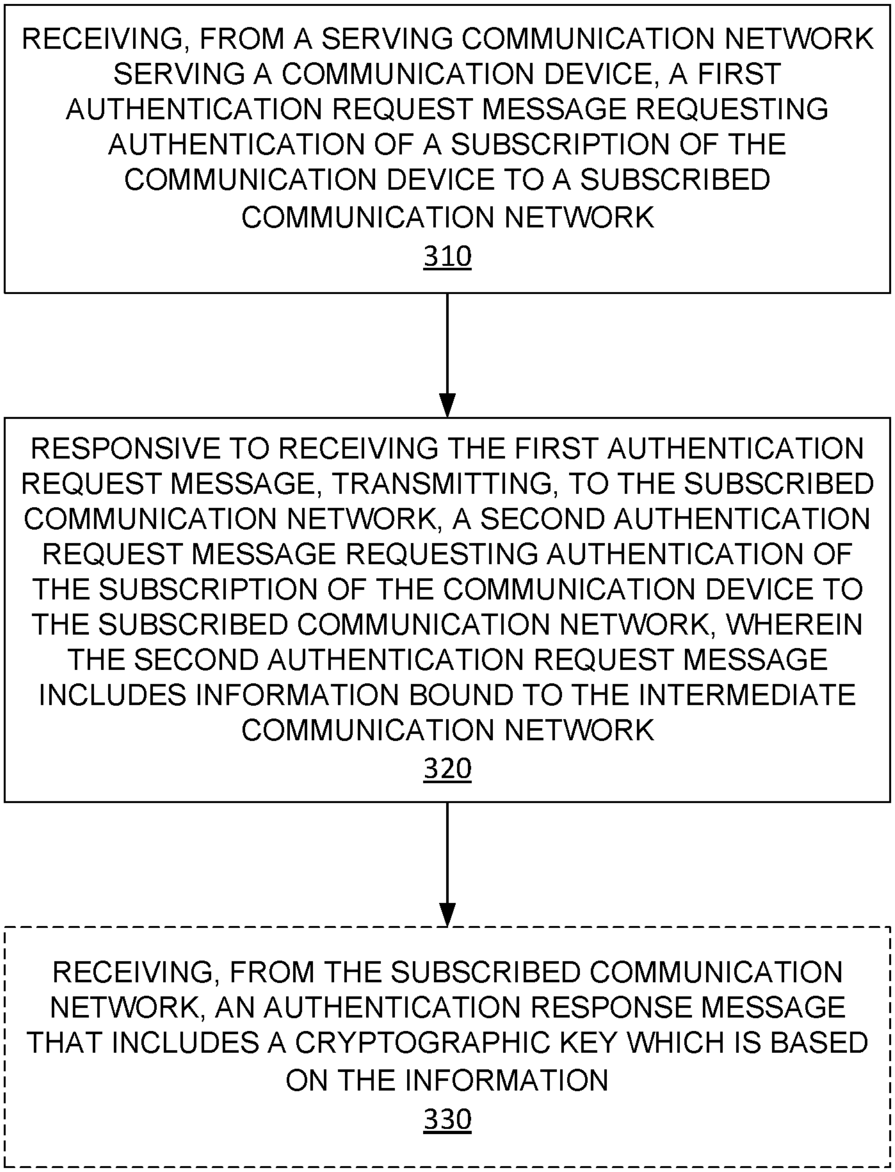
FIG. 7 is a logic flow diagram of a method performed by a network node in an intermediate communication network according to some embodiments.

FIG. 7 depicts a method performed by a network node 20N in an intermediate communication network 20 in accordance with other particular embodiments. The method includes receiving, from a serving communication network 30 serving a communication device 2, a first authentication request message requesting authentication of a subscription of the communication device 2 to a subscribed communication network 10 (Block 310).

The method as shown also comprises, responsive to receiving the first authentication request message, transmitting, to the subscribed communication network 10, a second authentication request message requesting authentication of the subscription of the communication device 2 to the subscribed communication network 10 (Block 320). This second authentication request message includes information 20B bound to the intermediate communication network 20.

In some embodiments, the method also comprises receiving, from the subscribed communication network 10, an authentication response message that includes a cryptographic key 20K which is based on the information 20B (Block 330).

Embodiments herein also include corresponding apparatuses. Embodiments herein for instance include a communication device 2 configured to perform any of the steps of any of the embodiments described above for the communication device 2.

Embodiments also include a communication device 2 comprising processing circuitry and power supply circuitry. The processing circuitry is configured to perform any of the steps of any of the embodiments described above for the communication device 2. The power supply circuitry is configured to supply power to the communication device 2.

Embodiments further include a communication device 2 comprising processing circuitry. The processing circuitry is configured to perform any of the steps of any of the embodiments described above for the communication device 2. In some embodiments, the communication device 2 further comprises communication circuitry.

Embodiments further include a communication device 2 comprising processing circuitry and memory. The memory contains instructions executable by the processing circuitry whereby the communication device 2 is configured to perform any of the steps of any of the embodiments described above for the communication device 2.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the communication device 2. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a network node configured to perform any of the steps of any of the embodiments described above for the network node 10N or 20N.

Embodiments also include a network node comprising processing circuitry and power supply circuitry. The processing circuitry is configured to perform any of the steps of any of the embodiments described above for the network node 10N or 20N. The power supply circuitry is configured to supply power to the radio network node.

Embodiments further include a network node comprising processing circuitry. The processing circuitry is configured to perform any of the steps of any of the embodiments described above for the network node 10N or 20N. In some embodiments, the network node further comprises communication circuitry.

Embodiments further include a network node comprising processing circuitry and memory. The memory contains instructions executable by the processing circuitry whereby the radio network node is configured to perform any of the steps of any of the embodiments described above for the network node 10N or 20N.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 8:
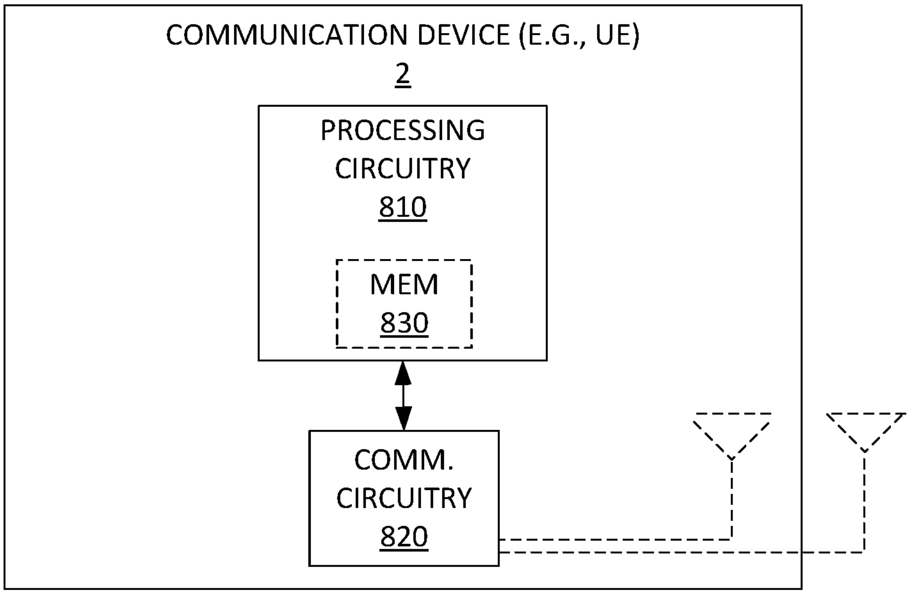
FIG. 8 is a block diagram of a communication device according to some embodiments.

FIG. 8 for example illustrates a communication device 2 as implemented in accordance with one or more embodiments. As shown, the communication device 2 includes processing circuitry 810 and communication circuitry 820. The communication circuitry 820 (e.g., radio circuitry) is configured to transmit and/or receive information to and/or from one or more other nodes, e.g., via any communication technology. Such communication may occur via one or more antennas that are either internal or external to the communication device 2. The processing circuitry 810 is configured to perform processing described above, e.g., in FIG. 5, such as by executing instructions stored in memory 830. The processing circuitry 810 in this regard may implement certain functional means, units, or modules.

Figure 9:
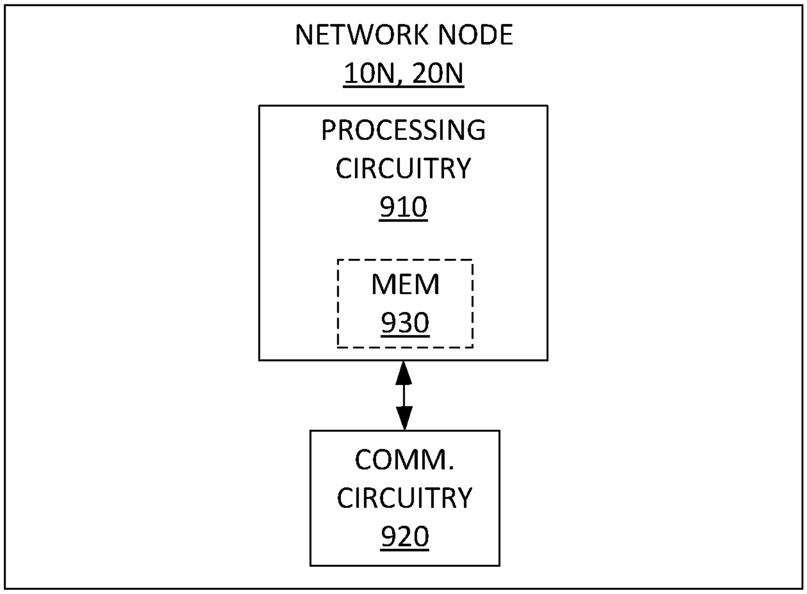
FIG. 9 is a block diagram of a network node according to some embodiments.

FIG. 9 illustrates a network node 900 as implemented in accordance with one or more embodiments. The network node 900 may for instance be network node 10N or network node 20N. As shown, the network node 900 includes processing circuitry 910 and communication circuitry 920. The communication circuitry 920 is configured to transmit and/or receive information to and/or from one or more other nodes, e.g., via any communication technology. The processing circuitry 910 is configured to perform processing described above, e.g., in FIG. 6 and/or FIG. 7, such as by executing instructions stored in memory 930. The processing circuitry 910 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Embodiments herein may apply to any type of communication, whether wireless or wireline. When applied to wireless communication, for example, the communication device 2 may be a wireless communication device and one or more of the networks 10, 20, 30 may be a wireless communication network.

Figure 10:
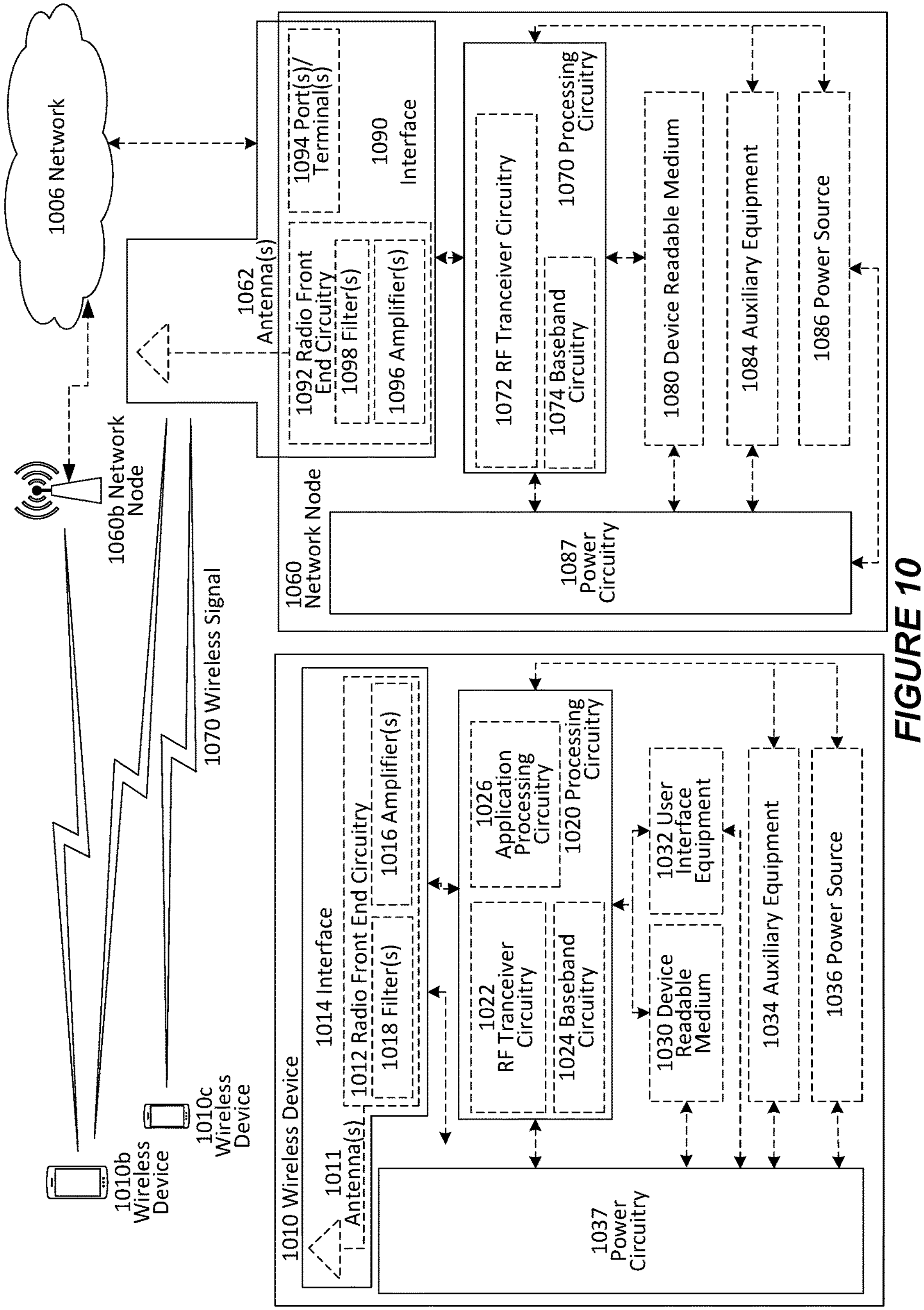
FIG. 10 is a block diagram of a wireless communication network according to some embodiments.

More particularly, although the subject matter described herein may be implemented in any appropriate type of system using any suitable components, the embodiments disclosed herein may in particular be applicable in a wireless network, such as the example wireless network illustrated in FIG. 10. For simplicity, the wireless network of FIG. 10 only depicts network 1006, network nodes 1060 and 1060*b*, and WDs 1010, 1010*b*, and 1010*c*. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 11:
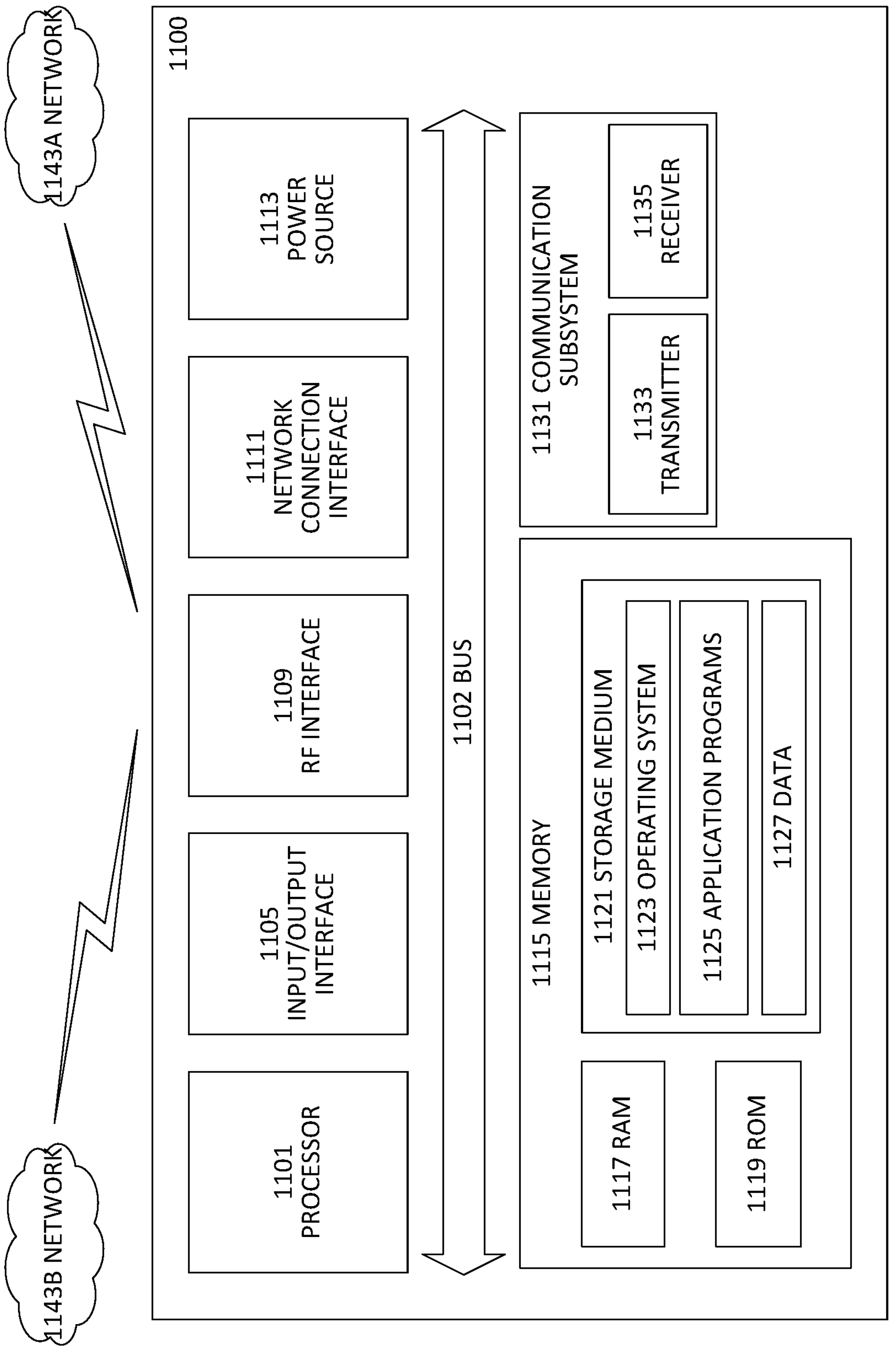
FIG. 11 is a block diagram of a user equipment according to some embodiments.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 11200 may be any UE identified by the 3rd Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143*a*. Network 1143*a* may encompass wired and/or wireless networks such as a local-area network (LAN), a wide-area network (WAN), a computer network, a wireless network, a telecommunications network, another like network or any combination thereof. For example, network 1143*a* may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143*b* using communication subsystem 1131. Network 1143*a* and network 1143*b* may be the same network or networks or different network or networks. Communication subsystem 1131 may be configured to include one or more transceivers used to communicate with network 1143*b*. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143*b* may encompass wired and/or wireless networks such as a local-area network (LAN), a wide-area network (WAN), a computer network, a wireless network, a telecommunications network, another like network or any combination thereof. For example, network 1143*b* may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
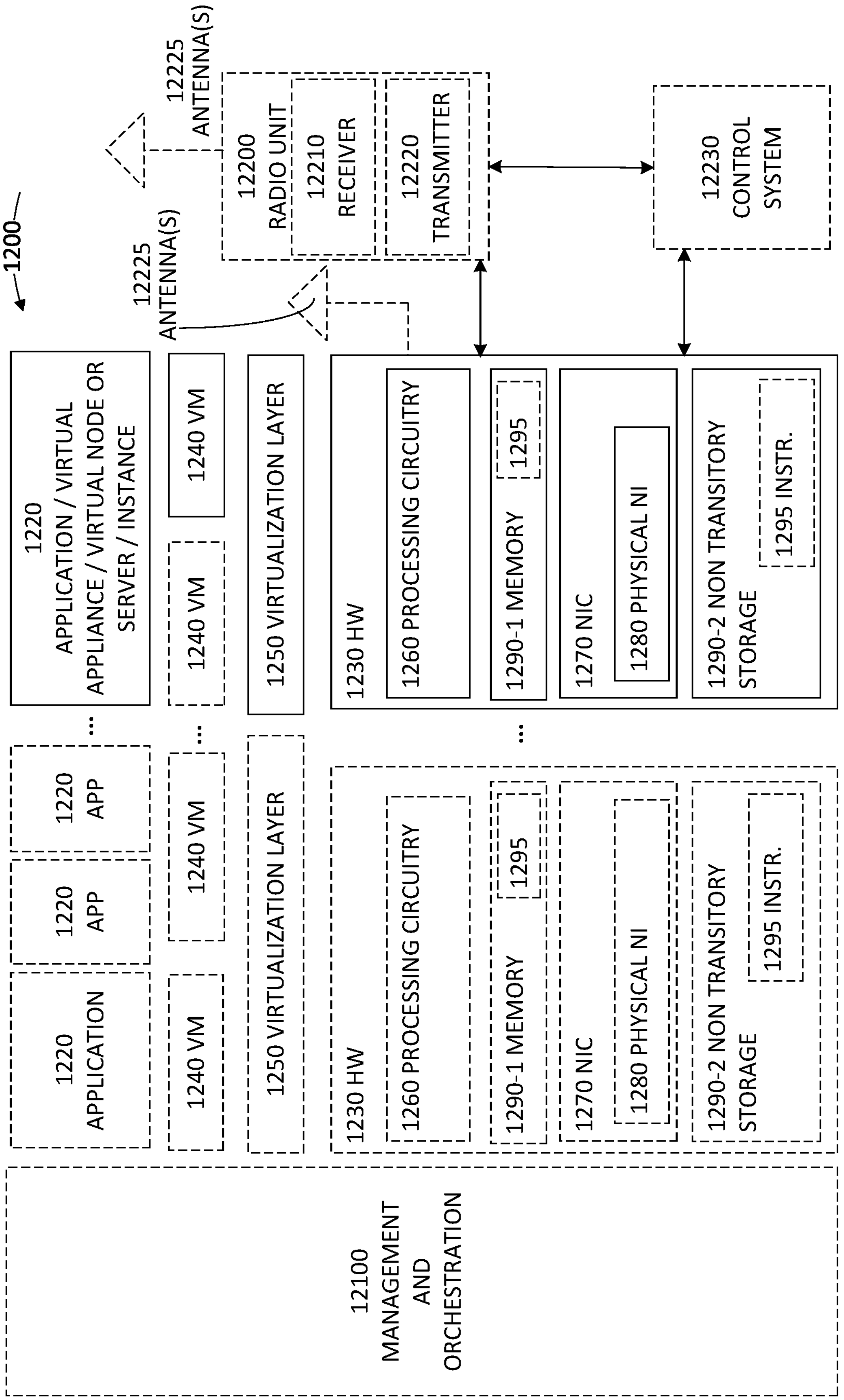
FIG. 12 is a block diagram of a virtualization environment according to some embodiments.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 13:
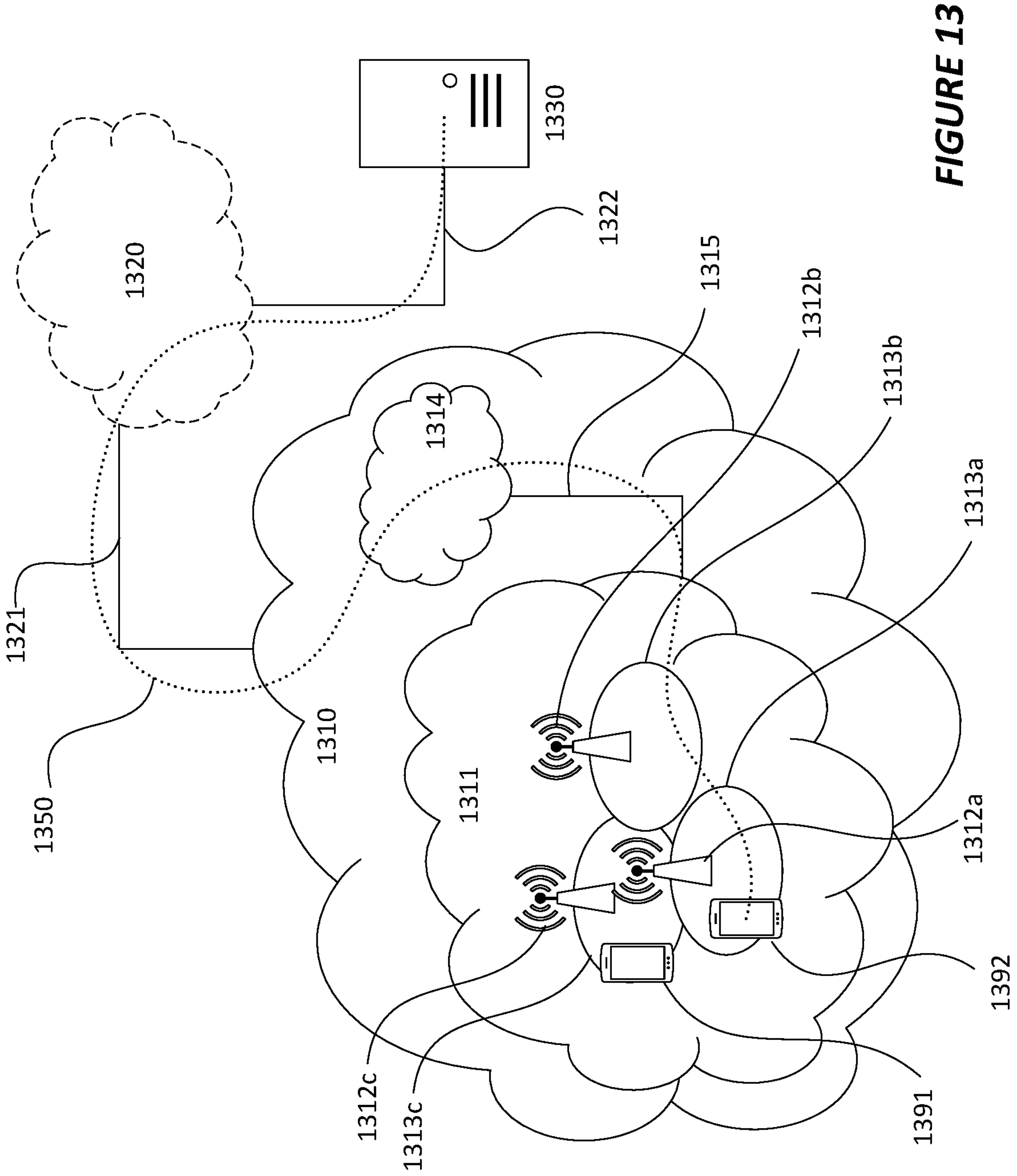
FIG. 13 is a block diagram of a communication network with a host computer according to some embodiments.

FIG. 13 illustrates a telecommunication network connected via an intermediate network to a host computer in accordance with some embodiments. In particular, with reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations **1312*a*, 1312*b*, 1312*c*, such as NBs, eNBs, gNBs or other types of wireless access points, each defining a corresponding coverage area 1313*a*, 1313*b*, 1313*c*. Each base station 1312*a*, 1312*b*, 1312*c* is connectable to core network 1314 over a wired or wireless connection 1315. A first UE 1391 located in coverage area 1313*c* is configured to wirelessly connect to, or be paged by, the corresponding base station 1312*c*. A second UE 1392 in coverage area 1313*a* is wirelessly connectable to the corresponding base station 1312*a*. While a plurality of UEs 1391, 1392 are illustrated in this example, the disclosed embodiments are equally applicable to a situation where a sole UE is in the coverage area or where a sole UE is connecting to the corresponding base station 1312**.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 14:
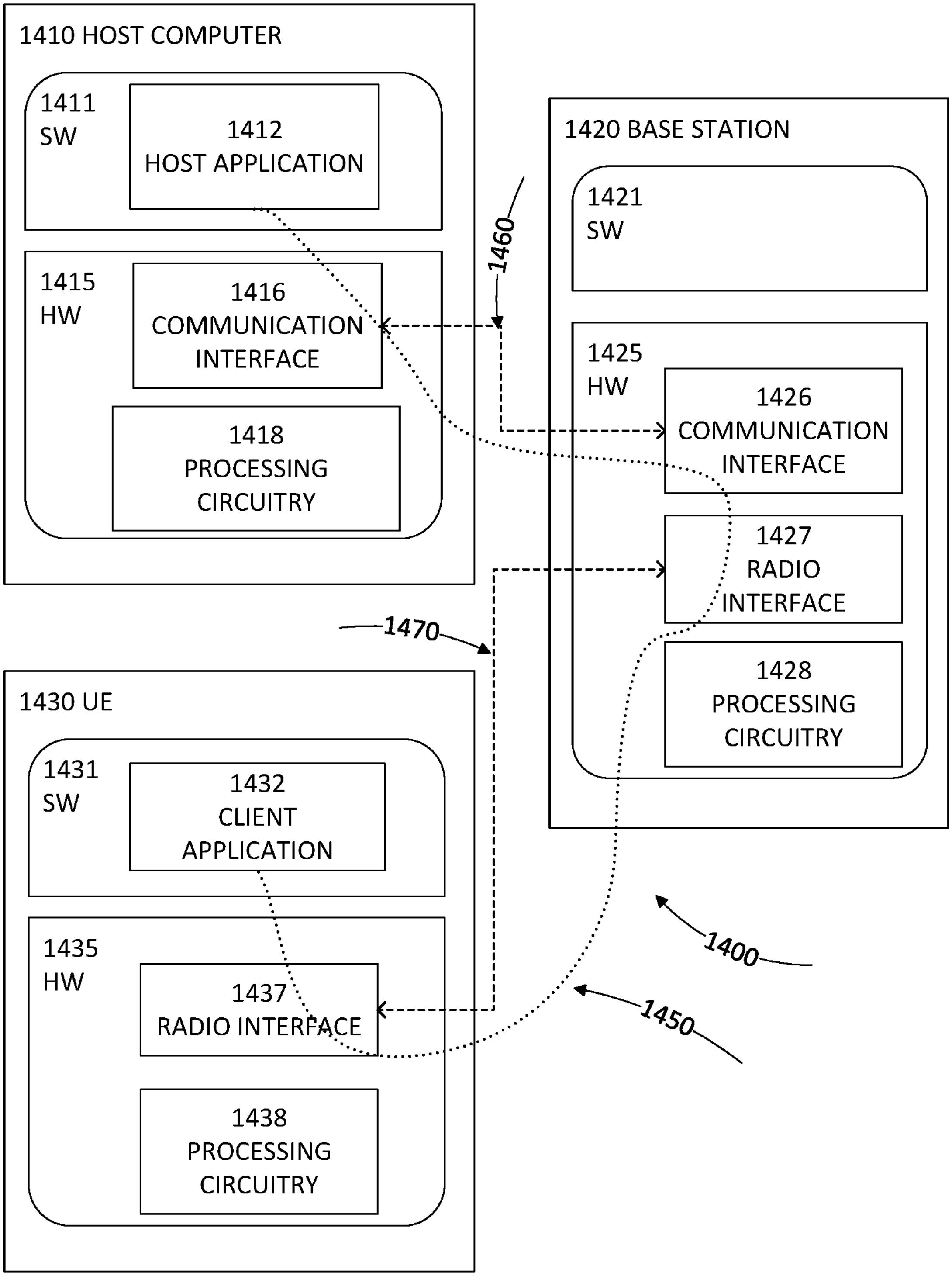
FIG. 14 is a block diagram of a host computer according to some embodiments.

Example implementations, in accordance with an embodiment, of the UE, base station and host computer discussed in the preceding paragraphs will now be described with reference to FIG. 14. FIG. 14 illustrates host computer communicating via a base station with a user equipment over a partially wireless connection in accordance with some embodiments In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 14 may be similar or identical to host computer 1330, one of base stations 1312*a*, 1312*b*, 1312*c* and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
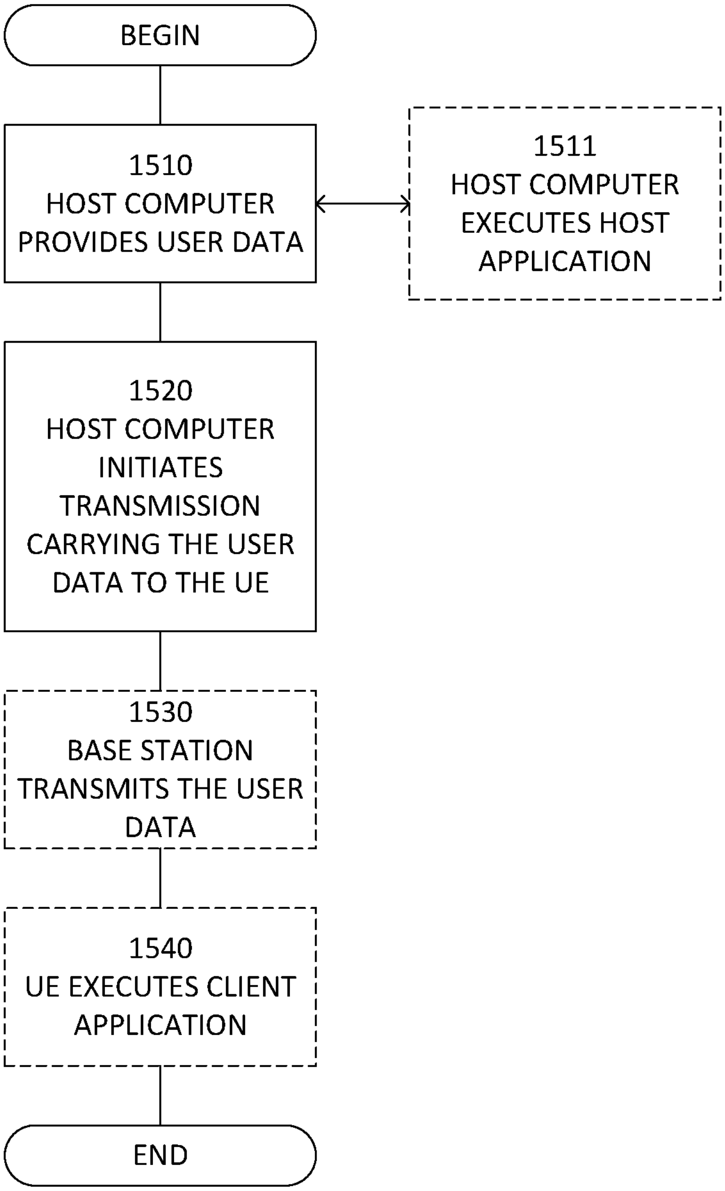
FIG. 15 is a flowchart illustrating a method implemented in a communication system, in accordance with one embodiment.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 16:
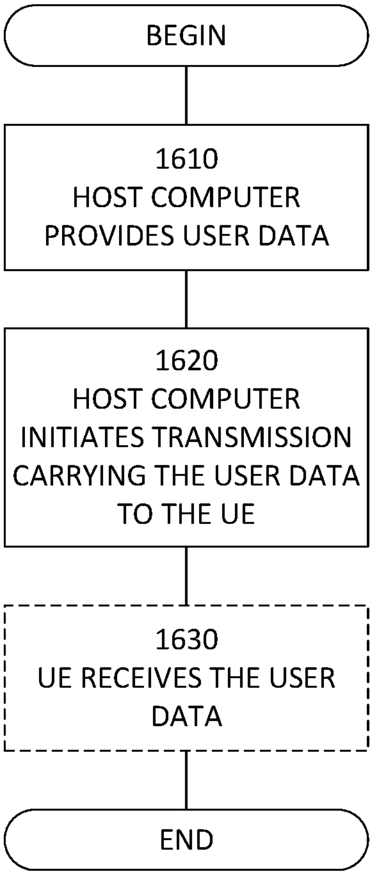
FIG. 16 is a flowchart illustrating a method implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
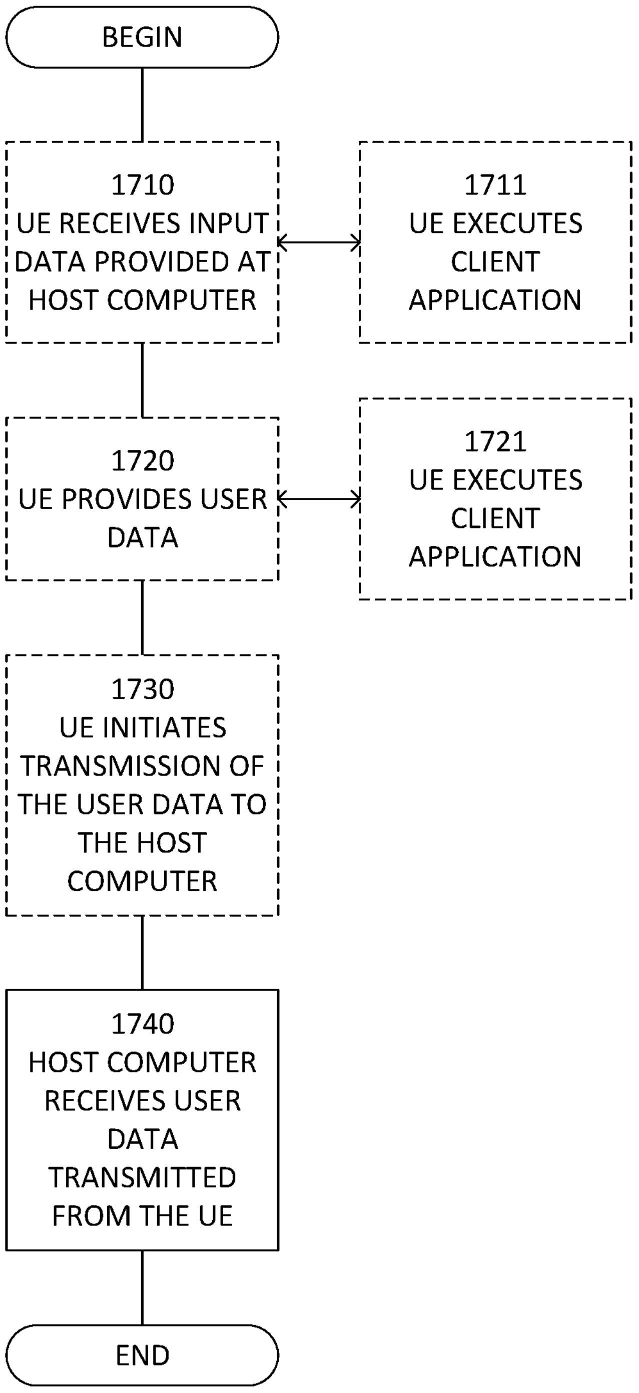
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 18:
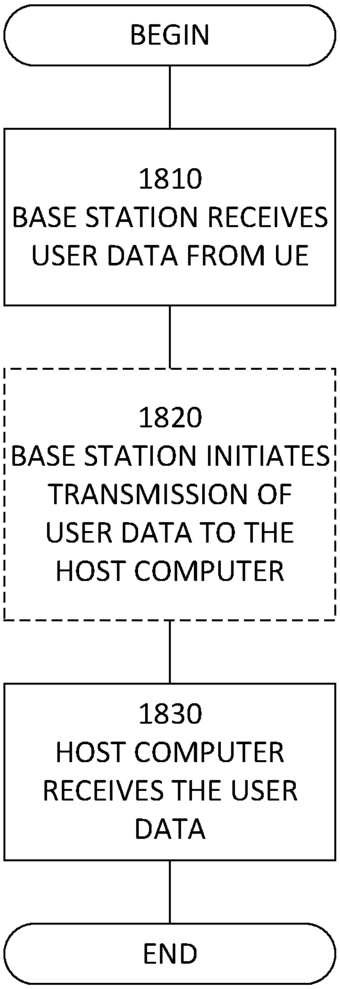
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The term "A and/or B" as used herein covers embodiments having A alone, B alone, or both A and B together. The term "A and/or B" may therefore equivalently mean "at least one of any one or more of A and B".

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a communication device, the method comprising:

generating a cryptographic key as a function of information bound to an intermediate communication network via which the communication device authenticates a subscription to a subscribed communication network, wherein the communication device is served by a serving communication network that differs from the intermediate communication network; and protecting communication for the communication device based on the generated cryptographic key;

wherein each of the intermediate communication network, the subscribed communication network, and the serving communication network comprise a core network;

wherein the cryptographic key is, or is generated also as a function of, a key shared between the communication device and an authentication server in the subscribed communication network.

2. The method of claim 1, wherein the intermediate communication network is a public network and/or the serving communication network is a public network.

3. The method of claim 1, wherein the intermediate communication network is a non-public network and/or the serving communication network is a non-public network.

4. The method of claim 1, wherein the information bound to the intermediate communication network is an identity of the intermediate communication network.

5. The method of claim 1, wherein the information bound to the intermediate communication network is included in, or encoded within, a serving network name parameter.

6. The method of claim 1, wherein the intermediate communication network serves the subscribed communication network.

7. A method performed by a network node in a subscribed communication network to which a communication device has a subscription, the method comprising:

generating a cryptographic key as a function of information bound to an intermediate communication network via which the communication device authenticates the subscription to the subscribed communication network, wherein the communication device is served by a serving communication network that differs from the intermediate communication network; and sending the cryptographic key to the intermediate communication network;

wherein each of the intermediate communication network, the subscribed communication network, and the serving communication network comprise a core network;

wherein the cryptographic key is, or is generated as a function of, a key shared between the communication device and an authentication server in the subscribed communication network.

8. The method of claim 7, wherein the intermediate communication network is a public network and/or the serving communication network is a public network.

9. The method of claim 7, wherein the intermediate communication network is a non-public network and/or the serving communication network is a non-public network.

10. The method of claim 7, wherein the information bound to the intermediate communication network is an identity of the intermediate communication network.

11. The method of claim 7, wherein the information bound to the intermediate communication network is included in, or encoded within, a serving network name parameter.

12. The method of claim 7, wherein the intermediate communication network serves the subscribed communication network.

13. A method performed by a network node in an intermediate communication network, the method comprising:

receiving, from a serving communication network serving a communication device, a first authentication request message requesting authentication of a subscription of the communication device to a subscribed communication network; and responsive to receiving the first authentication request message, transmitting, to the subscribed communication network, a second authentication request message requesting authentication of the subscription of the communication device to the subscribed communication network, wherein the second authentication request message includes information bound to the intermediate communication network;

wherein each of the intermediate communication network, the subscribed communication network, and the serving communication network comprise a core network;

the method further comprising receiving, from the subscribed communication network, an authentication response message that includes a cryptographic key which is based on the information.

14. The method of claim 13, wherein the intermediate communication network is a public network and/or the serving communication network is a public network.

15. The method of claim 13, wherein the intermediate communication network is a non-public network and/or the serving communication network is a non-public network.

16. The method of claim 13, wherein the information bound to the intermediate communication network is an identity of the intermediate communication network.

17. A communication device comprising:

communication circuitry; and processing circuitry configured to:

generate a cryptographic key as a function of information bound to an intermediate communication network via which the communication device authenticates a subscription to a subscribed communication network, wherein the communication device is served by a serving communication network that differs from the intermediate communication network; and protect communication for the communication device based on the generated cryptographic key;

wherein each of the intermediate communication network, the subscribed communication network, and the serving communication network comprise a core network;

wherein the cryptographic key is, or is generated also as a function of, a key shared between the communication device and an authentication server in the subscribed communication network.

* * * * *